United States Patent

Jacobsen et al.

[15] 3,653,464
[45] Apr. 4, 1972

[54] ENGINE OIL PAN

[72] Inventors: Eudell G. Jacobsen, Romeo; David A. Martens, Washington, both of Mich.

[73] Assignee: General Motors Corporation, Detroit, Mich.

[22] Filed: Apr. 13, 1970

[21] Appl. No.: 27,924

[52] U.S. Cl. ............................. 184/6.2, 184/6.5, 184/106
[51] Int. Cl. ..................................................... F01m 11/06
[58] Field of Search ............... 184/6.2, 106, 6.5; 123/196 R

[56] References Cited

UNITED STATES PATENTS

| | | | |
|---|---|---|---|
| 3,101,129 | 8/1963 | Hulten | 184/106 |
| 3,189,126 | 6/1965 | May | 184/106 X |
| 1,878,224 | 9/1932 | Woolson | 184/6.2 |
| 2,938,601 | 5/1960 | Brafford | 184/6.2 X |

FOREIGN PATENTS OR APPLICATIONS

| | | | |
|---|---|---|---|
| 466,157 | 2/1914 | France | 184/6.2 |
| 860,044 | 9/1940 | France | 184/6.2 |

*Primary Examiner*—Manuel A. Antonakas
*Attorney*—Arthur N. Krein and Jean L. Carpenter

[57] ABSTRACT

An oil pan assembly for the combustion engine in a motor vehicle in which an oil pan of suitable configuration for the engine is provided with a separate cover baffle member which encloses all but the rear portion of the oil pan so that oil will be retained within the pan during normal motor vehicle operation and will also be retained therein when the motor vehicle is shipped in a nose-down position in a railroad car.

3 Claims, 4 Drawing Figures

Patented April 4, 1972

3,653,464

INVENTORS
Eudell G. Jacobsen &
BY  David A. Martens

Arthur N. Krein
ATTORNEY

ENGINE OIL PAN

This invention relates to an engine oil pan structure and specifically to an oil pan structure for an internal combustion engine for use in a motor vehicle. It has long been a problem in the engine of a motor vehicle to maintain a satisfactory oil level within the oil pan of the engine under all vehicle operating conditions. When the vehicle is stationary, the oil seeks the lowest level within the oil pan which is normally the oil sump portion of the pan whereat the oil pump intake usually is located. During vehicle maneuvering and during periods of sudden acceleration or deceleration, the oil tends to shift from side to side or rear to front, respectively, but during this movement of the oil within the oil pan it is desirable to maintain the oil inlet immersed in oil.

Another problem recently encountered is to retain the oil within the oil pan during shipment of the vehicle, since it has now been proposed to transport vehicles in a nose-down position in railroad box cars. To facilitate movement of the vehicle onto and off of a box car, it is desirable to have the vehicle operative under its own power which of course would require operation of the engine with a normal quantity of lubricating oil therein.

Accordingly, the primary object of this invention is to improve an engine oil pan structure whereby it is adapted to retain a supply of oil to provide adequate and continuous engine oil lubrication during vehicle maneuvering including braking, and to retain a supply of oil when the motor vehicle is shipped in a nose-down position in a railroad car.

Another object of this invention is to improve an engine oil pan structure whereby to provide a partially closed oil container so that oil in the oil pan will be retained from leaking out of the front crankshaft seal of the engine when the motor vehicle is shipped in a nose-down position.

These and other objects of the invention are obtained by means of a two-piece oil pan unit including an oil pan and a separate cover baffle member which extends over all but the rear portion of the oil pan to retain oil. An oil inlet strainer is carried on the cover baffle member by a V-shaped bracket and delivers oil through a tube extending from the rear of the oil pan structure.

For a better understanding of the invention, as well as other objects and further features thereof, reference is had to the following detailed description of the invention to be read in connection with the accompanying drawings, wherein.

Figure 1:
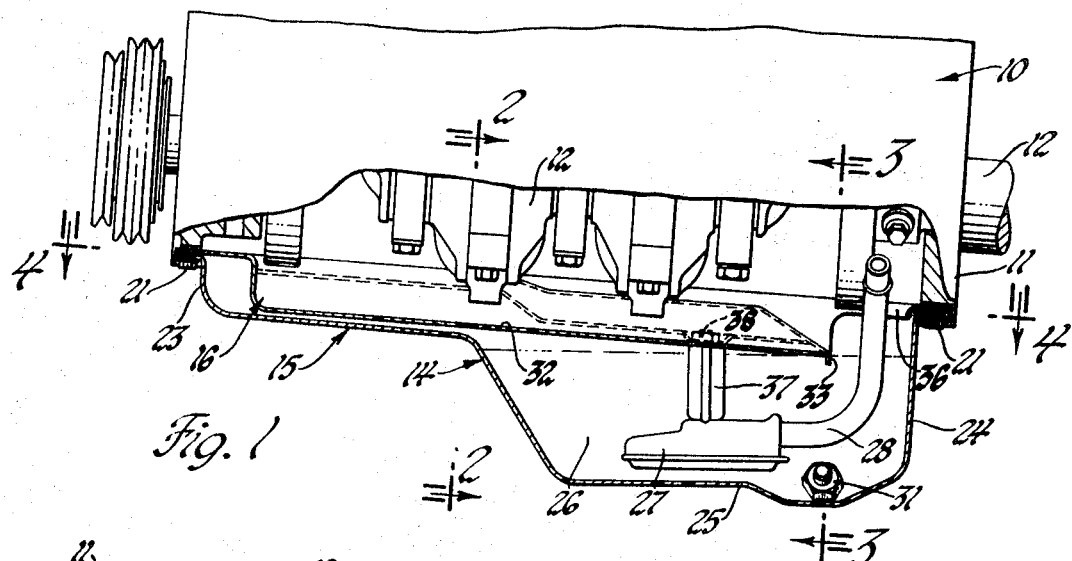
FIG. 1 is a side view of an internal combustion engine having an oil pan assembly constructed in accordance with the invention, parts of the oil pan being broken away to show details of its structure.
Figure 2:
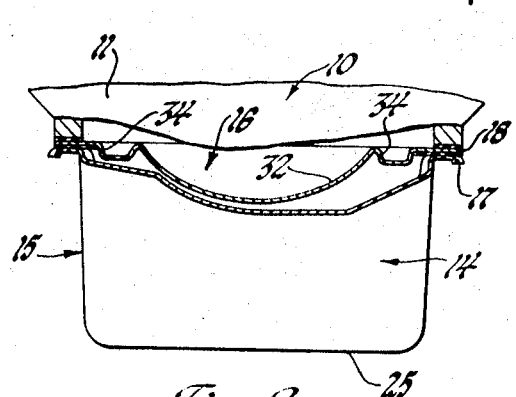
FIG. 2 is a sectional view taken along line 2—2 of FIG. 1.

Referring now to FIG. 1, there is shown an internal combustion engine 10 having a cylinder block 11 with a conventional crankshaft 12 suitably journaled longitudinally therein. Secured to the bottom of the cylinder block is an oil pan assembly, generally designated 14, in accordance with the invention and of a suitable configuration to enclose the underside of the cylinder block.

As shown, the oil pan assembly 14 includes an oil pan 15 and a cover baffle member 16 which extends over and partly encloses the oil pan, the oil pan and baffle member 16 having peripheral flanges 17 and 18, respectively, corresponding in shape and size to the underside of the cylinder block 11 to which it is secured as by bolts 21.

Figure 3:
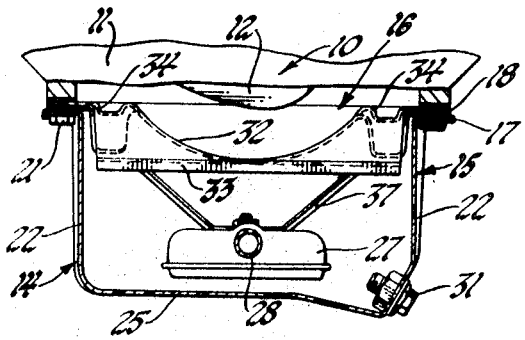
FIG. 3 is a sectional view taken along line 3—3 of FIG. 1.

Oil pan 15 formed, for example, of pressed sheet metal, is provided with side walls 22, front and rear end walls 23 and 24, respectively, and a stepped bottom panel 25 whereby the rear end, the right-hand end as seen in FIG. 1, of the oil pan provides a downwardly extending oil reservoir or sump 26 in which is mounted a conventional oil pickup 27 connected by conduit 28 to an oil pump, not shown, to supply lubricating oil to the engine. As seen in FIG. 3, an oil drain plug 31 is provided in a side wall 22 of the oil pan at the lowest level of the oil sump 26.

Figure 4:
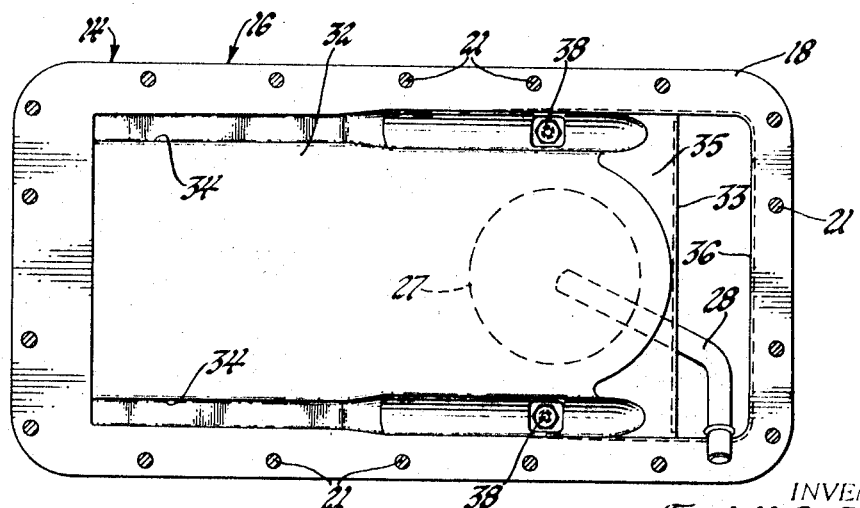
FIG. 4 is a top view of the oil pan assembly.

Baffle 16, which is pierced at its rear or right-hand end as seen in FIG. 4, is provided with a central longitudinal extending trough-like depression 32 terminating in a depending lip 33. In addition, trough-like drain channels 34 are provided on opposite sides of the depression 32 and extend from the front of the baffle toward the rear pierced portion of the baffle, with a downward stepped deeper portion toward the rear of the baffle which terminates into a downward extending rear drain shelf 35 merging into the depending lip 33. Oil dropping from the crankshaft, for example, will flow by gravity in the depression 32 and drain channels 34 to drain into the oil sump 26. As seen in FIG. 1, the mounting of the engine in a vehicle, and therefore the baffle 16, is such that when the vehicle is on a level surface, the baffle slopes downward from the front to the rear, left to right as seen in this figure. The depending lip 33 extends laterally across the baffle relatively close to the rear flange 18 portion thereof to form a relatively narrow lateral opening 36 into the oil pan above sump 26, the remaining portion of the oil pan being fully enclosed and sealed by the baffle 16. Oil pickup 27 is secured to the underside of baffle 16 by a V-shaped support member 37 extending laterally across the baffle and secured at opposite sides thereto by means of fasteners 38, the oil pickup 27 thus being positioned within the oil sump 26 in position to have the conduit 28 extend out through the opening 36 in the baffle 16.

With the arrangement of the oil pan structure disclosed, a normal quantity of oil adequate to provide lubrication to the engine would be contained in the oil sump 26 when the engine is in a normal operating position as shown in FIG. 1. However, if the engine is turned on its end, when the vehicle is positioned nose-down during transit in a railroad box car, this normal quantity of oil would flow by gravity to the forward part of this structure in terms of FIG. 1 with the level of the oil substantially below the opening 36 in the baffle 16. Thus, with this structure, all of the oil in the oil pan assembly will be retained therein during normal vehicle operation and will also be retained therein when the motor vehicle is shipped in a nose-down position in a railroad car, it being understood that oil in the engine being desired to permit operation of the vehicle to facilitate movement of the vehicle during loading and unloading of the vehicle in the railroad car.

What is claimed is:

1. An oil pan assembly for an internal combustion engine comprising an oil pan having a front wall, rear wall, side walls with flange means projecting therefrom and a stepped bottom wall providing an oil sump, a baffle cover having an outer flange corresponding to said flange means whereby said baffle cover and said oil pan are secured to the engine to form a retainer for oil with said oil sump positioned toward the back of the engine, said baffle cover having a narrow transverse opening at one end thereof positioned over said oil sump, said baffle cover including a central longitudinally extending trough-like depression and on opposite sides thereof longitudinally extending drain channels terminating at the front edge of said transverse opening.

2. An oil pan assembly for an internal combustion engine including an oil pan having wall means and a stepped bottom panel to form therein a lower sump chamber and having a peripheral flange integral with said wall means, a baffle member having a peripheral flange corresponding to said flange of said oil pan, said baffle being provided with a narrow laterally extending pierced opening at one end thereof and having a central longitudinally extending trough-like depression and on opposite sides thereof longitudinally extending drain channels, all of which terminate at the edge of said pierced opening, said baffle and said oil pan being adapted to be secured to the internal combustion engine with said sump chamber and said pierced opening at the rear of the engine to provide an oil pan structure adapted to retain oil therein during normal engine operation and when the engine is shipped in a front end-down position.

3. An oil pan assembly for an internal combustion engine, said oil pan assembly including an oil pan having side walls, front wall, rear wall and a stepped bottom panel defining an oil reservoir including a sump chamber, one wall of which is formed by said rear wall, baffle means secured to said oil pan in spaced relation to said stepped bottom panel to form with said stepped bottom panel, said side walls and said front wall an oil reservoir for the engine when the engine is positioned nose-down, said baffle means including a drain opening therein adjacent said rear wall and over said sump chamber, and a central longitudinally extending trough-like depression and on opposite sides thereof longitudinally extending drain channels terminating at the front edge of said drain opening which extends transversely across said baffle means.

* * * * *